(12) United States Patent
Chaffee

(10) Patent No.: US 6,650,078 B1
(45) Date of Patent: Nov. 18, 2003

(54) METHOD AND SYSTEM FOR CONTROLLING MECHANICAL SYSTEMS EXHIBITING DISCONTINUITY IN INERTIAL LOADING

(75) Inventor: Mark A. Chaffee, Etna, NH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 29 days.

(21) Appl. No.: 10/131,875

(22) Filed: Apr. 24, 2002

(51) Int. Cl.[7] ............................................. G05B 11/01
(52) U.S. Cl. .................. 318/630; 318/560; 318/568.22; 318/632
(58) Field of Search ................................ 318/630, 560, 318/568.22, 632; 333/17 R, 174

(56) References Cited

U.S. PATENT DOCUMENTS 4,198,612 A * 4/1980 Morton ...................... 333/17.1

* cited by examiner

Primary Examiner—Karen Masih
(74) Attorney, Agent, or Firm—Patrick S. Yoder; Alexander M. Gerasimow; William R. Walbrun

(57) ABSTRACT

A technique is provided for adapting feedback control system performance to applications involving changing inertial loads. A modified gain profile is applied for a control system block that includes isolated torque scaling. The torque scaling block facilitates the generation of gain profiles specifically adapted to the changing inertial conditions of the load. Dilatory effects of backlash and similar load discontinuity can be avoided, therefore, by appropriately applying gain profiles to reduce gain within a region of reduced load.

21 Claims, 3 Drawing Sheets

METHOD AND SYSTEM FOR CONTROLLING MECHANICAL SYSTEMS EXHIBITING DISCONTINUITY IN INERTIAL LOADING

BACKGROUND OF THE INVENTION

The present invention relates generally to the field of mechanical systems, such as rotationally driven equipment. More particularly, the invention relates to a technique for more smoothly or accurately controlling movement of such mechanical systems to compensate for discontinuities in inertial loading.

A wide range of mechanical systems exist and are presently in use for driving various types of loads. Many systems include rotary machinery, such as engines or motors which drive loads either linearly or in rotation through the intermediary of various power transmission components. Such components may serve to appropriately locate a load with respect to a source (e.g. transfer position of application of forces) or may serve to alter the speed of the input source and, therewith, the reflected inertia of the load. In either case, it is generally desirable to provide for smooth control over a wide range of speeds and torques, with the ability to reverse directions of movement and hold accurate position where appropriate. In conventional power transmission systems, components interposed between a prime mover and a load may include various types of gear boxes, chain drives, servo drives, clutches, and so forth.

Depending upon the design and operation of the power transmission components in such systems, conditions may exist or develop in which the reflected load inertia is discontinuous. In a typical example, a gearbox, chain drive, or similar power transmission component, may exhibit a characteristic generally referred to as "backlash." Backlash may be considered a discontinuity in inertial loading due to a reduction in contact between two or more elements over a portion of a movement range. In a gearbox, for example, backlash may develop due to a loss of contact between neighboring gear teeth which generally intermesh to transmit rotary motion. The backlash may not be particularly noticeable when the load is driven. While the load is accelerating and decelerating the gear teeth are normally engaged. In most cases load friction keeps the gear teeth engaged even when the load is driven at a constant speed. However, when the system is held static, or when there is minimal friction applied to the load moving at constant speed, backlash may be result in sudden changes in the reflected load inertia which can lead to servo control instability. Another problem with backlash is the difficulty in maintaining accurate control in servo applications.

At present, servo tuning and adaptive control are key control technologies enabling drive and motion products to be easily applied to industrial motion control applications, particularly to power transmission applications. The objective of servo tuning algorithms, sometimes refer to in the industry as "auto-tuning" when applied to the motion control, is automatically to achieve a well tuned, "application-ready" position or velocity servo loop. The servo loop generally refers to the control loop which is established to maintain a desired position or velocity as indicated by an input or command signal. Servo tuning is typically accomplished through foreknowledge of the motor-mechanical system or through the application of a minimal motion profile to an unknown motor-mechanical system. In either case, servo tuning algorithms result in servo loops that are generally tuned for a fixed load inertia.

One of the main objectives of adaptive control algorithms, sometimes referred to as "adaptive tuning," is to maintain acceptable servo control performance levels despite significant variations in parameters associated with the motor-mechanical system. One common adaptive control problem that motion control engineers face is compensating for a variable system inertia, such as that present in discontinuous inertia situations such as that described above, and in particular in situations where backlash is present. Adaptive control algorithms compensate for these variations by continuously measuring the inertia of the system or by calculating the inertia based on the current position, time, or control state.

Traditional servo loop topologies do not make the task of developing auto-tuning or adaptive control algorithms a straightforward process. Servo control loops generally need to interface to a wide variety of drive power structures, motors, and mechanical systems, as well as to feedback devices. With traditional servo loop technologies, a variation in any of these components affects multiple gain parameters. When these variations occur in real time, such as due to discontinuities in inertial loading, modification of multiple gain parameters using adaptive control is awkward.

There is a need, therefore, for improved approaches to control of systems in which varying or inconsistent inertia loading may be present. There is a need, at present, for a straightforward approach to the control of loads in mechanical systems in which there is variation in load inertia. In particular, there is a need to compensate for discontinuous variation in load inertia as a function of position such as exhibited by mechanical backlash.

SUMMARY OF THE INVENTION

The present invention provides a novel control technique designed to respond to these needs. The technique is particularly well suited to the control of rotational systems, such as motor-driven loads including gear boxes, chain drives, ball-screws, or any other power transmission components which may be subject to discontinuities in load inertia. However, it should be borne in mind that the invention is susceptible to application in a more wide range of settings. That is, linear or other power transmission applications may also benefit from the technique, particularly where inertia loading may vary or where servo systems may require rapid adaptability to changing loads or speeds. In an exemplary embodiment, the invention is applied to a power transmission system including a gear box that exhibits backlash. Other systems, however, may exhibit similar control issues, and the invention is intended to address similar problems in all such applications.

In accordance with one aspect of the invention, a method for controlling a mechanical system exhibiting backlash includes generating control signals for application to an actuator in accordance with a first gain level. The first gain level is applied when a normal inertia load is applied to the actuator. The gain level is then reduced to a second level when a reduced inertial load is applied to the actuator within a backlash range of motion. Various profiles may be provided for transitioning between the first and second levels, and the gain levels may be adapted to the specific application and loading.

A system is also provided by virtue of the present technique. The system may include an actuator coupled to a machine and configured to drive the machine in response to control signals. A controller is coupled to actuator and is configured to apply control signals to the actuator, with the controller applying the control signals based upon a first gain level when a normal inertial load is coupled to the actuator, and reducing the gain level to a second level when a reduced inertial load is applied to the actuator within a backlash range of motion.

Again, a broad understanding of the term backlash is contemplated in accordance with the present technique. That is, the technique may be generally applied within a range of motion which is susceptible to sudden and significant variations in inertial loading, such as due to a change in contact two or more machine elements.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
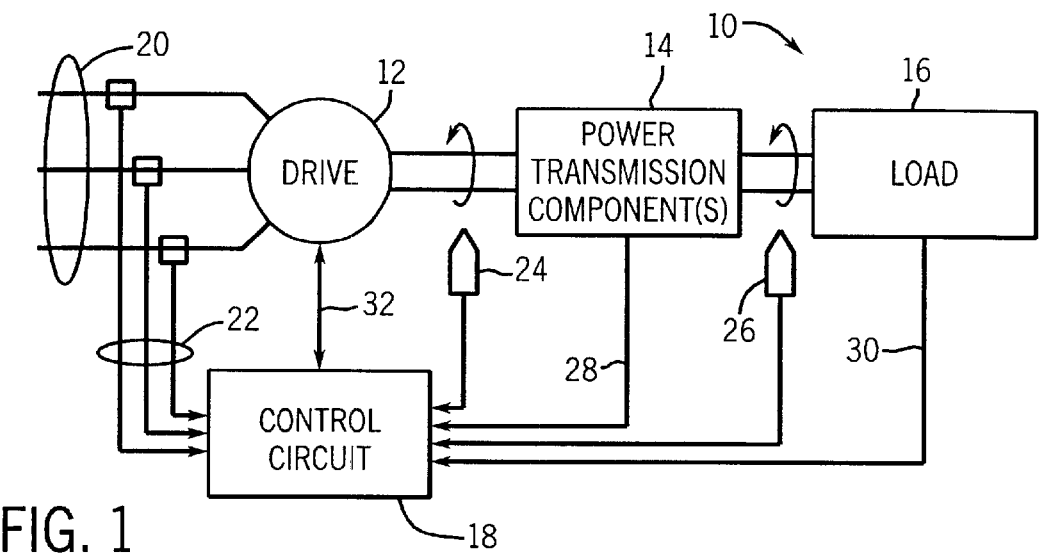
FIG. 1 is a diagrammatical overview of a machine system including one or more power transmission components and a load which is susceptible to changes in inertial loading and which will be controlled in accordance with the present technique.

Turning now to the drawings, and referring first to FIG. 1, an exemplary motion control system is illustrated and represented generally by reference numeral 10. While many various system configurations may be envisaged for implementation of the present techniques, the system illustrated in FIG. 1 includes a drive 12 such as an electric motor, coupled to power transmission components 14 and therethrough to a load 16. The power transmission components, again, may include a wide variety of individual elements, such as couplings, gear reducers, chain drives, pulleys, clutches, and so forth. In general, however, the power transmission components serve to transmit mechanical force from the drive 12 to the load 16. In a typical application, power transmission components may include a gear reducer which is driven by an electric motor to power a pulley, conveyor, pump, or any other mechanical load.

A control circuit 18 receives a variety of input signals and generates output signals for controlling the operation of the system. As will be appreciated by those skilled in the art, control circuits such as that illustrated diagrammatically in FIG. 1 may include general purpose or application-specific computers, various interface circuitry, user interfaces, and so forth. Control circuit 18 may receive signals of various natures depending upon the design of the system. However, in the illustrated embodiment power conductors 20 which supply incoming power to drive 12 also originate input signals via sensors to the control circuit 18 as indicated at reference numeral 22. The sensors will typically include sensors for current and voltage through the power conductors. Of course, various upstream circuit components may be included in the system and are not illustrated in FIG. 1, such as protective devices, power supplies, switch gear, and so forth. Other sensors are provided in the system for detecting parameters such as position and speed. In the illustrated embodiment sensors 24 and 26 provide for feedback of position and speed signals both upstream and downstream of the power transmission components 14. The power transmission components 14 may also originate feedback signals, such as position, speed, temperature, vibration, and so forth that may be fed into a control circuit for control, monitoring or diagnostic purposes. Finally, feedback signals may originate from the load as indicated at reference numeral 30, such as to provide indications of position, speed, load (e.g. weight), and so forth. Based upon these signals, and upon signals received from the drive itself, the control circuit 18 determines appropriate output control signals for regulating operation of the drive and applies these signals to the drive as indicated at reference numeral 32. Of course, intermediate components may be provided between the control circuit and the drive, such as for isolation, signal conditioning, and so forth. In general, however, the control circuit will apply control signals to the drive in accordance with predetermined control algorithms which may include closed loop position control, velocity control, torque control, or a combination of these.

Figure 2:
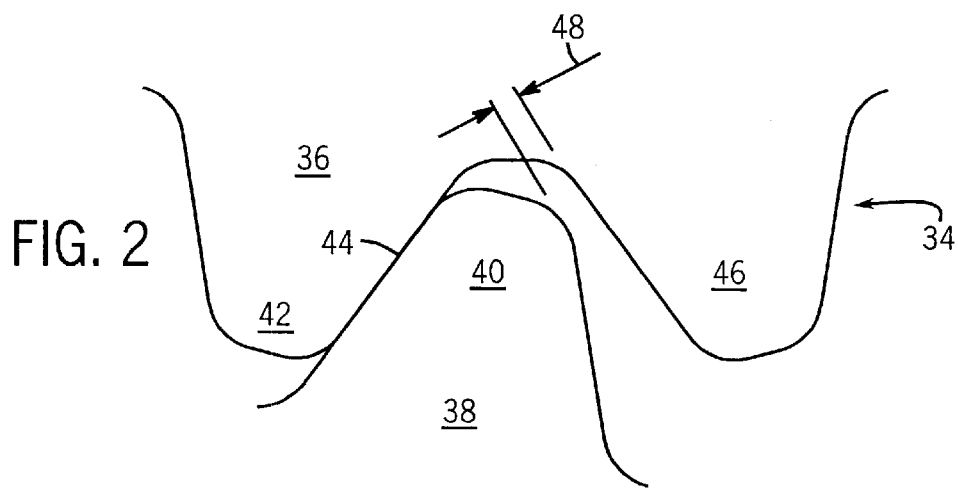
FIG. 2 is a detailed representation of a section of two intermeshing gears illustrating one source of discontinuity in inertial loading due to backlash.

Through the control algorithms executed by control circuit 18, various adaptations may be made to the dynamic characteristics of the drive, the power transmission components and the load itself. In particular, the control circuitry is specifically adapted to accommodate power transmission trains in which discontinuities or significant changes in inertial loading may occur. In particular, such significant changes in loading may be the result of loss of contact between power transmission components, such as due to effects known as backlash. FIG. 2 illustrates a typical situation that may result in such backlash.

As shown in FIG. 2, in a gear reducer, gearing represented generally by reference numeral 34, will include intermeshing gears 36 and 38, each having teeth designed to contact one another to transmit torque from a driving gear to a driven gear. In the illustration of FIG. 2, for example, gear 36 may be driven by gear 38, by contact of tooth 40 of gear 38 with tooth 42 of gear 36. In convolute gearing, rolling contact is generally maintained as indicated generally at reference numeral 44.

Due to wear, manufacturing tolerances, and other mechanical causes, spacing or gaps may develop within the gearing, such as between tooth 40 and a subsequent tooth 46 on gear 36. The gap, indicated at reference numeral 48 in FIG. 2, may not pose significant problems when the gears are driven in a single direction and relatively steady loading. However, if the process calls for changes in direction of rotation, or for the gears to remain static, driven gear 38 may experience a significant reduction in inertial loading due to the presence of gap 48. That is, the gap will represent a range of positions over which gear 38 is generally not loaded.

Figure 3:
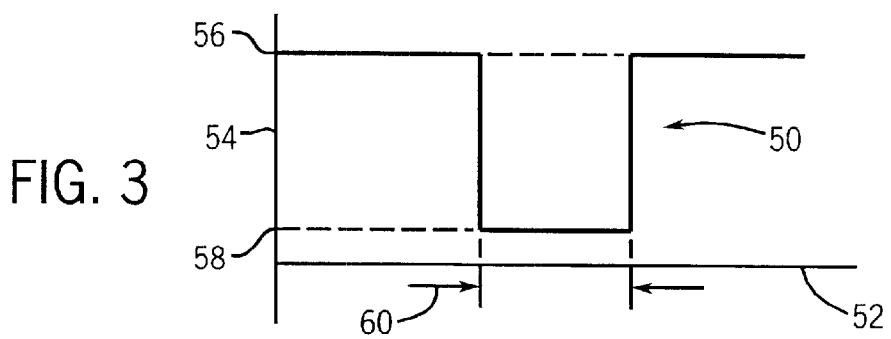
FIG. 3 is an exemplary profile of an inertia discontinuity, which can result from backlash in systems as that illustrated in FIG. 2.

FIG. 3 is a graphical representation of the discontinuity in inertial loading, which can result from backlash in gearing or other power transmission components. As shown in FIG. 3, the graphical representation indicated at reference numeral 50 illustrates inertia experienced by the drive components of the system. The position or angle axis 52 indicates the linear or rotary position of the driving member, while the load axis 54 indicates inertial loading of the driving members. As can be seen from the profile of the loading 50, under load the driving members experience a relatively elevated load level 56 which, of course, may vary somewhat depending upon the characteristics of the load and the application. However, a substantially reduced load 58 is experienced over the backlash range 60.

The present technique permits adaptation of control signals delivered by a control circuit 18 (see FIG. 1) to accommodate substantial changes in loading of the type illustrated graphically in FIG. 3. The control scheme is preferably implemented through nested control loops. In a present embodiment, the control servo loops may consist of three "nested" control loops. The inner-most loop is referred to as a current or torque servo loop. Surrounding the torque loop is a velocity servo loop and, finally, surrounding the velocity loop is a position servo loop. The characteristics of these control loops in a present embodiment will now be described in greater detail.

A complete model for a velocity servo drive and motor in accordance with aspects of the present technique includes the electrical and mechanical time constance of the motor, and can be rather cumbersome in implementation and analysis. However, in the present approach, a simplification of the analysis is based upon assuming that the motor is a pure inertia load, and that the current/torque loop is a simple single-pole filter having a time constant T. The time constant of the model represents the sum of the delays through the velocity loop. Thus, the closed loop bandwidth of the lumped model for the torque servo loop may be represented by the relationship:

$$BW(\text{torque}) = 1/T. \tag{1}$$

Figure 4:
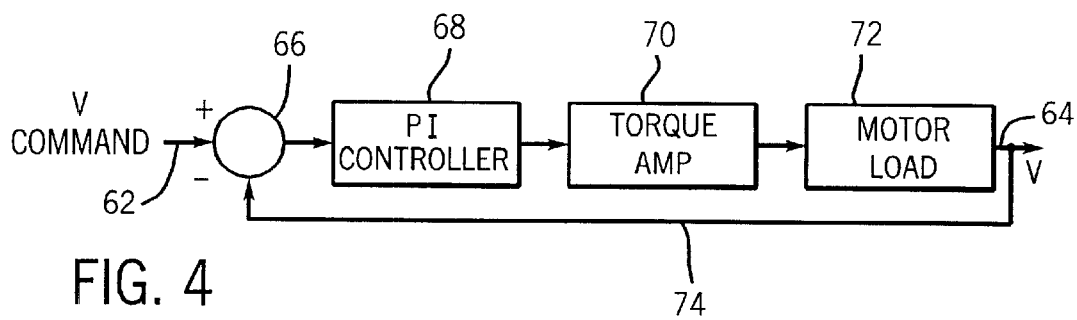
FIG. 4 is a simplified velocity servo loop block diagram for a system of the type illustrated in FIG. 1.

The resulting simplified velocity servo loop block diagram may be represented as illustrated in FIG. 4. As shown in FIG. 4, a velocity command signal indicated by reference numeral 62 is applied to the loop, with an output signal 64 resulting from the loop. The output signal and command signal are combined at a summing junction 66. The combination is applied to a proportional/integral controller 68. The transfer function for the proportional/integral controller may be represented by the sum:

$$Kp + Ki/s. \tag{2}$$

The output of the proportional/integral controller is applied to a torque amplifier 70. The transfer function for the torque amplifier may be represented by the value:

$$1/(Ts+1). \tag{3}$$

The output of the torque amplifier is then applied to the motor load 72, which may be modeled as the as a lumped inertial load, J, where J is the sum of the motor inertia and the reflected load inertia as seen by the motor:

$$1/Js. \tag{4}$$

The output signal 64 results from the motor load and is fed back to the summing junction 66 as indicated at reference numeral 74 in FIG. 4.

As will be appreciated by those skilled in the art, the transfer functions and values indicated for the velocity loop are in the S-domain. The value Kp represents the proportional gain, Ki is the integral gain, T, again is the sum of all delays around the closed loop system (torque loop delay, computational delay, sampling delay, etc.), and J is the total system inertial. The system inertia expressed in torque units per acceleration unit, can be thought as including the gain of the drive amplifier and the gain of the feedback transducer, as well as the motor reflected load inertia.

It should be understood that the foregoing model does not address the impact friction, damping, mechanical compliance on servo behavior, nor does it address non-linear effects such as mechanical backlash or dead band, discussed in greater detail below. The usefulness of the model is based on the fact that inertia is the dominant factor in most servo control applications, and is the focus for the following development.

A set of general equations for Ki and Kp can be developed from the foregoing model as functions of T, J, and the classical damping factor $\zeta$. The unity-gain bandwidth of the velocity servo loop is found to be given by the ratio of the proportional gain and the inertia, that is, Kp/J. The velocity loop equations, in terms of the foregoing nomenclature, may be written as follows:

$$BW(\text{vel}) = Kp(\text{vel})/J = \tfrac{1}{4}\zeta^2 * 1/T; \tag{5}$$

$$Kp(\text{vel}) = J * \tfrac{1}{4}\zeta^2 * 1/T = J * BW(\text{vel}); \tag{6}$$

and $$Ki(\text{vel}) = 1/J * \tfrac{1}{4}\zeta^2 * Kp^2(\text{vel}). \tag{7}$$

With these relationships in hand, a similar set of general equations can be used to compute a complete set of proportional and integral parameters for the outer position servo loop.

Figure 5:
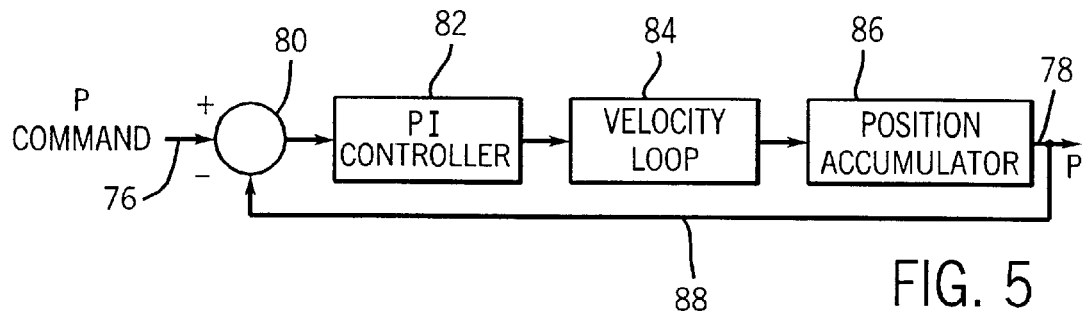
FIG. 5 is a simplified position loop block diagram for the system of FIG. 1.

The position loop block diagram may be illustrated as shown in FIG. 5. A position command signal is applied to the system as indicated at reference numeral 76 to produce a position output 78. The two are combined at summing junction 80, and the resultant signal is applied to the proportional integral/controller 82. The transfer function for the proportional/integral controller 82 may be identical to that indicated above for the controller 68 of FIG. 4. Output from the positional integral controller is applied to the velocity loop 84. The transfer function for the velocity loop may be written in terms of Damping Factor, $\zeta$, and Natural Frequency, $\omega_n$, as follows:

$$\frac{\omega_n^2}{s^2 + 2\zeta\omega_n s + \omega_n^2}. \tag{8}$$

The output of the velocity loop is applied to a position accumulator 86, which may be considered to have a transfer function:

$$1/s. \tag{9}$$

The position accumulator output is the position signal 78, which is fed back to summing junction 80 as indicated at reference numeral 88 in FIG. 5.

A rigorous mathematical analysis of the position loop model demonstrates that the most practical measure of bandwidth for the position servo loop is given by proportional gain for the position loop, that is Kp (pos), which represents the unity gain bandwidth of the position servo loop. The position loop equations, then, may be written in terms of the values described above as follows:

$$BW(pos)=Kp(pos)=\frac{1}{16}*1/\zeta^4*1/T=\frac{1}{4}\zeta^2*BW(vel); \quad (10)$$

$$Kp(pos)=BW(pos); \quad (11)$$

and $$Ki(pos)=\frac{1}{4}\zeta^2*Kp^2(pos). \quad (12)$$

It should first be noted that the bandwidth formulas for the three control loops are related to one another by the classical damping factor of the second order velocity servo loop. The nested loop bandwidth relationship may be expressed:

$$BW(pos)=\frac{1}{4}\zeta^2*BW(vel)=\frac{1}{4}\zeta^2*\frac{1}{4}\zeta^2*BW(torque). \quad (13)$$

As can be seen from the foregoing analysis, to achieve a given damping for the closed loop system response, the servo loops may be tuned such that each loop has a bandwidth that is a factor of $\frac{1}{4}\zeta^2$ less than the bandwidth of the next inner loop. This bandwidth relationship may be illustrated as shown in FIG. 6.

Figure 6:
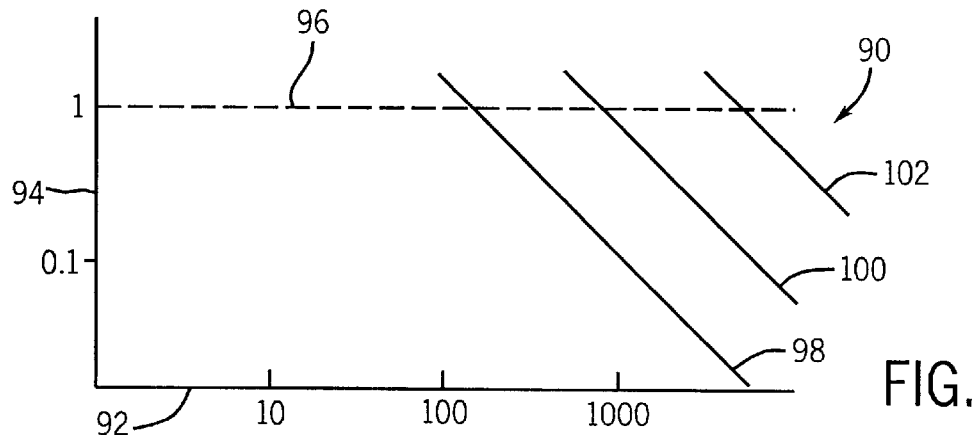
FIG. 6 is a graphical representation of Bode magnitude plots for each of the loops in a system of the type illustrated in FIG. 5.

FIG. 6 shows a series of functions 90 displayed over a frequency range along axis 92 and a magnitude range along axis 94. The Bode magnitude plots of FIG. 6 represent a damping factor $\zeta=1$. A unity magnitude value is represented by the dashed line 96 in FIG. 6. Plot 98 crosses the unity magnitude level at the position servo loop bandwidth value Kp(pos). The plot 100 crosses the same line at the velocity loop bandwidth value Kp(vel)/J. Finally, the plot 102 crosses the unity magnitude value at the torque loop bandwidth 1/T. The plots indicate that the closer the outer servo bandwidth is run to that of the inner loop, the more under damped the frequency response becomes. The bandwidth of both the position and velocity servo loops are, therefore, ultimately limited by the drive model time constant T, which may be estimated as the lump sum of all delays through the velocity loop. As indicated above, the time constant T may generally be considered to include servo computational delays, output filter time constants, current loop time constants, feedback sample delays, feedback filter time constants, and so forth. With the proper value of T established, it has been found through simulation studies and laboratory tests that the above equations work quite well in characterizing the frequency response of the system using the nested proportional/integral servo loop topology.

It may be noted from the discussion above that the proportional gain for each of the control loops is directly proportional to the unity-gain bandwidth of the loop. Because the unity-gain bandwidth is an important metric of servo performance, it is desirable to make use of this relationship. In the case of the velocity servo loop, however, the scaling factor is the inertia value J, which varies from application to application and can vary as a function of time or position in a given application. In the present approach, the proportional gain value is equal to the unity-gain bandwidth of the corresponding servo loop. To achieve this end, the scaling factor J must first be eliminated from the above equations.

Figure 7:
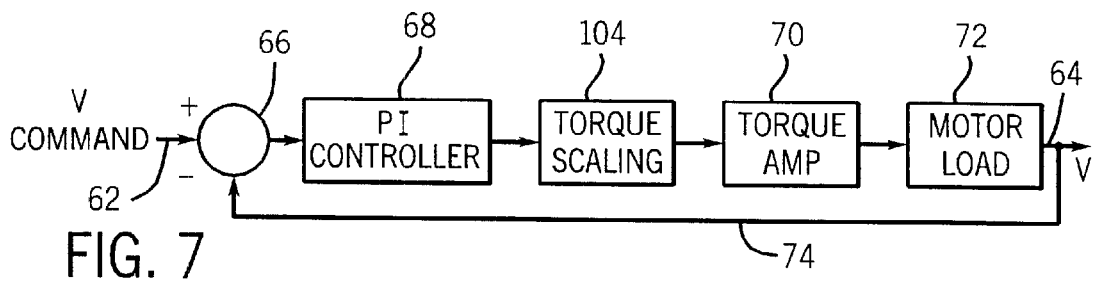
FIG. 7 is a modified block diagram for the system, illustrating introduction of a torque scaling factor to facilitate compensation for variable inertia conditions.

The torque integrator scaling factor J can be eliminated by adding a new gain term, called torque scaling, into the velocity servo model as shown in FIG. 7. As indicated in FIG. 7, the model, as in the velocity loop model of FIG. 4, calls for application of a velocity command signal at reference numeral 62 and a velocity output at reference numeral 64 fed back to a summing junction at reference numeral 66. Again, the output of the summing junction is applied to the proportional/integral controller 68. However, the output of the controller is applied to a torque scaling block 104. By setting the torque scaling gain of block 104 equal to the system inertia, J, the term 1/J is canceled from the proportional gain equation. The output of the torque scaling of block 104 is applied to the torque amplifier 70 and therefrom to the motor load 72 as indicated above for the block diagram of FIG. 4.

Through the use of the torque scaling in the present technique the gain equations defined above can be simplified to the following:

$$Kp(vel)=BW(vel); \quad (14)$$

and $$Ki(vel)=\frac{1}{4}\zeta^2*Kp^2(vel); \quad (15)$$

for the velocity loop gains, and $$Kp(pos)=BW(pos); \quad (16)$$

and $$Ki(pos)=\frac{1}{4}\zeta^2*Kp^2(pos); \quad (17)$$

for the position loop gains. It can be seen from these equations, that the gain values are no longer dependent upon the system inertia, J, and the loop bandwidths are solely determined by the proportional gains.

As long as the torque scaling value matches the inertia of the system, J, the values for Kp and Ki should not vary significantly from application to application. In fact, because the model for a given servo drive or controller is known, the gains can be established using the foregoing equations based on the desired damping factor without prior knowledge of the motor, load, or feedback resolution. Thus, the problem of tuning the servo loop or compensating the servo loop for the system inertia variation has been simplified to the adjustment of a single value, the torque scaling gain. As described more fully below, accommodation of discontinuities or significant changes in inertia, such as due to backlash, can be provided by appropriately adjusting the torque scaling gain in accordance with the present technique.

The system inertia value J can be calculated from datasheets associated with a drive amplifier, motor, mechanical linkage, and feedback device. Various commercial control programming tools are available for performing such calculations, such as a tool commercially available under the designation MotionBook, from Rockwell Automation Inc. Alternatively, a simple auto-tuning algorithm can directly and accurately measure the value J. This algorithm may compute the acceleration and deceleration rates when a constant torque command is applied to the motor. The acceleration time, ta, needed to reach a programmed velocity may be measured, and after reversing the torque command, the deceleration time td may be measured to return to a zero velocity. Based upon such measurements, the system inertia J can be calculated in accordance with the relationship $$J = \frac{2To}{(Vo/ta+Vo/td)} * \frac{(RatedTorque)}{RatedSpeed/Sec}. \quad (18)$$

The auto-tuning routine can also compute the maximum acceleration and maximum deceleration values used by the motion control planner functions. Because the auto-tuning algorithm torque profile is used to actually measure the acceleration and deceleration rates for a known torque output value, the maximum acceleration and deceleration rates may be determined by extrapolating the computed values based upon an input that would have achieved full torque output. The auto-tuning algorithm typically sets the maximum acceleration and maximum deceleration parameters somewhat lower than the full limit, such as at approximately 85% of the calculated maximum rates, to ensure unsaturated acceleration and deceleration ramps.

While the auto-tuning algorithm is an affective mechanism for determining inertia value J, at the time the system is commissioned, changes over time in the system inertia or position may occur. To address such changes, traditional approaches included running the system with a fixed set of "non-optimized" gains to guarantee stability, or applying and adaptive tuning algorithm which continuously adjusts the various gains of the loop based upon the observed behavior of the axis while moving. Through the use of the torque scaling approach described above, it has been found that an effective mechanism for compensating for variations in system inertia is readily available. The adaptive control problem is affectively reduced to ensure that the torque scaling value accurately reflects the system inertia value. The servo bandwidth is therefore maintained despite inertia variations.

As noted above, in certain control applications, one or more axes may involve inertial loads which vary significantly over time or within a span of linear or angular position movements. For example, an "unwinder" is a common name for a class of applications in the high-packaging industry where sheet material is being unwound from a spool. The material is fed at constant linear rate using pitch rollers such that, over the course of time, the spool diameter shrinks. The spool represents a significant reflected load inertia to the motor driving the application. As the spool diameter shrinks, the inertia of the spool decreases according to a relationship which may be expressed:

$$J = \frac{1}{2} * mass * radius^2 = \frac{1}{2} * \pi * density * length * radius^4. \quad (19)$$

In this exemplary application, because the inertia varies with the fourth power of the spool radius, the total range of inertia variation can be considerable. If the servo axis is tuned with a fully loaded spool, it is highly likely that the axis will become unstable before the spool is emptied. On the other hand, if the gains are tuned based upon an empty spool to ensure stability, the servo axis will be seriously under-tuned when attempting to control a fully loaded spool. An effective adaptive tuning algorithm is therefore desirable to maintain servo bandwidth independent of the spool inertia. Adaptive tuning algorithms that rely on state observer methods are ill-suited for this class of time-varying inertia application. Observer methods require access to feedback that is "rich" in frequency content, such as found when the axis is undergoing rapid acceleration or deceleration. An unwinder, by contrast, runs at a fixed line speed during normal operation.

Quite often in applications such as unwinders, a sensor is provided that measures the diameter of the spool such that material can be unwound at a fixed speed independent of the spool diameter. The application program of the motion controller accomplishes this by regularly updating electronic gear ratios as the diameter changes. Leveraging this approach, the spool diameter can also be used in the application program to regularly computer the inertia value based upon equation 19 above. These computed inertia values are regularly applied to the torque scaling gain in the present technique while the axis is moving. Because the inertia changes very little in the short interval between updates (which may be on the order of 100 msec), disturbance to the axis is negligible.

In another industrial control context, changes in inertia with the position of an axis may occur. Articulating arm robots represent one such application. Control difficulties in such applications are further complicated by the fact the inertia of some of axes associated with the arm of a robot can vary with the position of the associated axis, and also with the position of other axes in the arm. A number of packaging applications also exist wherein similar problems arise from axes having multiple linkage points in variable inertia.

Difficulty in applying adaptive tuning approaches to this type of application stems from calculating and applying compensation rapidly enough to keep pace with the rapid motion of the machine. Packing machines routinely run at rates of 1000 products per minute, for example, which implies a cycle time of 60 msec. Since the mechanism can go through its full inertia variation within each cycle, new inertia values are needed at the servo update rate to provide effective compensation. Such rates may be too fast for adaptive tuning algorithms that employ state observers. The applications may also require updates at rates, which are too fast for an application program to compute the inertia and update the torque scaling parameter.

A solution to high-speed inertia compensation problems in such applications and in accordance with the present technique, employs a motion controller electronic cam functionality to generate a position-dependent inertia function. Numerical relationships between inertia and axis position can be established through the use of commercially available graphical cam editors. With a cam table thus computed, the inertia value can be mapped to the servo's torque scaling parameter and sent to the servo loop with the command position reference at the motion planner update rate. Assuming, for example, the motion planner update rate is comparable to the servo update rate (such as on the order of 250 $\mu$sec), the torque scaling value can be applied directly with little disturbance to the output of the servo loop. If the motion planner updates significantly slower than the servo update rate, fine interpolation can be employed to manage disturbances due to step changes in the torque scaling value. Again, however, the changing inertia can be compensated for by use of the present torque scaling technique.

As mentioned above, a number of applications also include inconsistencies or substantial changes in inertial loading due to characteristics such as backlash. If the servo loop is tuned for peak performance with a load applied in such applications, the axis will be at best under-damped and at worst unstable in the condition where the gear teeth, or similar mechanical components, are not engaged. In the worst case, the motor axis and the input gear oscillate considerable between the limits imposed by the output gear teeth, as indicated by reference numeral 60 in FIG. 3 discussed above. The net effect can be an audible buzzing when the axis is at rest. If the condition persists, the mechanical components, including the gear reducer, may wear prematurely. To prevent this condition, the conventional approach has been to de-tune the servo such that the axis is stable without the gear reducer load applied. Unfortunately, a system performance suffers from this approach.

Due to its non-linear, discontinuous nature, adaptive tuning algorithms generally fall short of addressing the backlash problem. However, the present technique has been found to provide an effective compensation mechanism for such applications by use of the torque scaling gain which can be adapted to the backlash profile.

Figure 8:
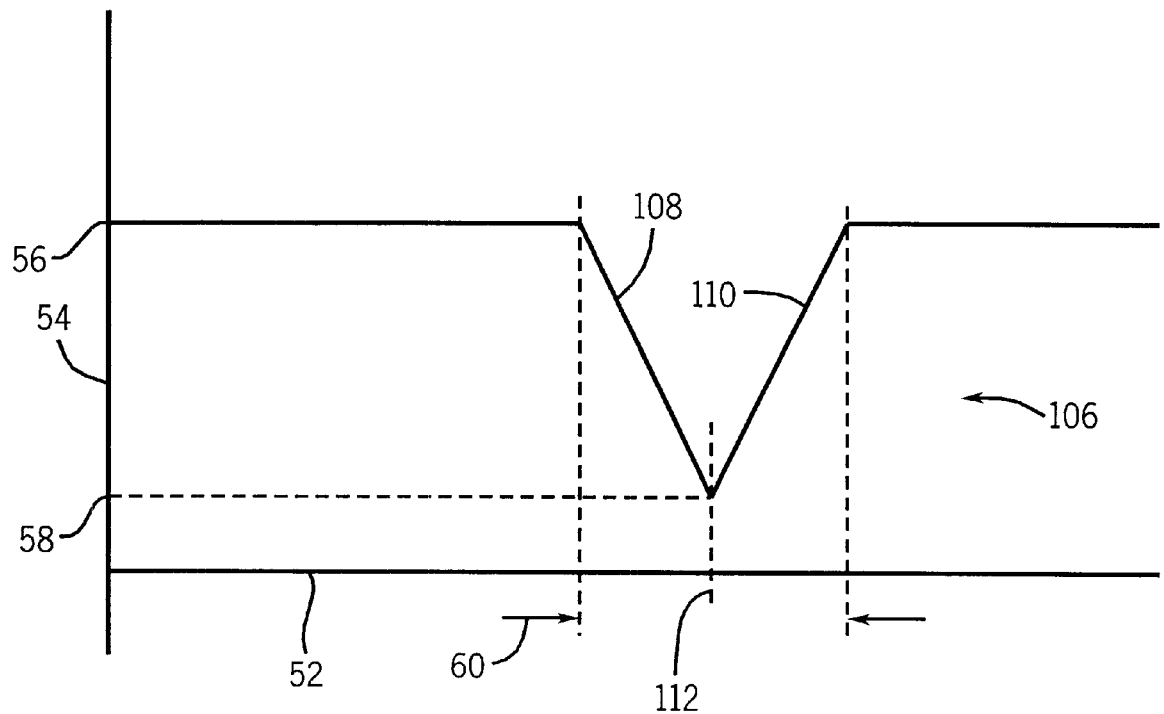
FIG. 8 is a graphical representation of an exemplary gain profile for the torque scaling in a system of the type illustrated in FIG. 7 for addressing discontinuous inertial loading.

As represented in FIG. 8, a gain profile 106 is applied for torque scaling to accommodate changes in loading of the type illustrated in FIG. 3. The profile 106 of FIG. 8 includes application of gains at an elevated level 56 to accommodate normal loading as described above with respect to FIG. 3. However, over the backlash range 60, altered gains may be applied to reduce the tendency of the system to oscillate between loaded positions. In the illustrated embodiment, the profile is tapered from the normal gain level 56 to a reduced gain level 58, generally corresponding to the motor inertia alone. A linear ramp 108 is employed in the present embodiment between the upper gain level 56 and the lower gain level 58, with a similar linear ramp 110 being applied from the lower gain level to the loaded gain level at the opposite side of the backlash region 60. An inflection point 112 may correspond generally to the center of the backlash region 60. While other profiles, such as cubic profiles, stepped profiles, and so forth may be applied, it has been found that the linearly ramped profile illustrated in FIG. 8 provides excellent results. Moreover, the tapered profile of FIG. 8 may be preferred over a stepped profile because as the position error exceeds the backlash distance, a step profile may create a large discontinuity in the torque output. The modified gain profile of FIG. 8 may be applied when the acceleration command to the servo loop is zero, that is, when no acceleration or deceleration is commanded that would engage the teeth of the gearbox, or similar mechanical components. Alternatively, the profile may be applied when there is simply no commanded motion. As noted above, during such periods, the affects of the discontinuity in loading may not be present or problematic. It has been found that the use of the modified gain profile of FIG. 8 can entirely eliminate the ill-affects of gear reducer buzz without sacrificing any performance of the servo system.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for controlling a mechanical system exhibiting backlash, the method comprising:
    generating control signals for application to an actuator in accordance with a first gain level when a normal inertial load is applied to the actuator; and
    reducing the gain level to a second level when a reduced inertial load is applied to the actuator within a backlash range of motion.

2. The method of claim 1, wherein the first gain level is based upon inertia of the load and inertia of the actuator.

3. The method of claim 2, wherein the second gain level is based upon inertia of the actuator only.

4. The method of claim 1, wherein the gain level is reduced linearly from the first level to the second level.

5. The method of claim 4, wherein the gain level reaches a minimum at a midpoint of the backlash range of motion.

6. The method of claim 1, wherein the control signals are generated in nested velocity and torque control loops.

7. A method for controlling a mechanical system exhibiting backlash behavior, the method comprising:
    determining a backlash range of motion;
    determining a first gain level to be applied to an actuator during normal loading;
    determining a second gain level to be applied to the actuator during backlash loading, the second gain level being less than the first gain level; and
    generating a gain profile to be applied to the actuator within the backlash range of motion based upon the first and second gain levels.

8. The method of claim 7, wherein the gain profile includes a backlash region in which a gain level is reduced from the first level to the second level.

9. The method of claim 8, wherein the backlash region is centered at a midpoint of the backlash range of motion.

10. The method of claim 9, wherein the gain level within the backlash region is reduced linearly from the first level to the second level.

11. The method of claim 7, comprising the further step of storing the gain profile for generation of control signals to be applied to the actuator.

12. The method of claim 8, wherein gain levels within the backlash region are determined by subtracting the second gain level from the first gain level and dividing the resulting value by one half the backlash range.

13. The method of claim 7, wherein the first gain level is determined based upon inertia of a load and inertia of the actuator.

14. The method of claim 13, wherein the second gain level is determined based upon inertia of the actuator only.

15. A system for controlling a machine, the system comprising:
    an actuator coupled to the machine and configured to drive the machine in response to control signals; and
    a controller coupled to the actuator and configured to apply control signals to the actuator, the controller applying control signals based upon a first gain level when a normal inertial load is coupled to the actuator, and reducing the gain level to a second level when a reduced inertial load is applied to the actuator within a backlash range of motion.

16. The system of claim 15, further comprising a position sensor coupled to the controller, wherein the control signals are a function of position of the actuator as detected by the position sensor.

17. The system of claim 15, wherein the first gain level is based upon inertia of the load and inertia of the actuator.

18. The system of claim 17, wherein the second gain level is based upon inertia of the actuator only.

19. The system of claim 15, wherein the gain level is reduced linearly from the first level to the second level.

20. The system of claim 19, wherein the gain level reaches a minimum at a midpoint of the backlash range of motion.

21. The system of claim 15, wherein the control signals are generated in nested velocity and torque control loops.

* * * * *